United States Patent [19]
Macario

[11] Patent Number: 5,846,482
[45] Date of Patent: Dec. 8, 1998

[54] LANCE FOR BLOWING FLUID-STATE SUBSTANCES INSIDE FURNACES, PARTICULARLY FOR STEEL PRODUCTION

[75] Inventor: Federico Macario, Lovere, Italy

[73] Assignee: Elti S.r.l., Sovere, Italy

[21] Appl. No.: 630,996

[22] Filed: Apr. 12, 1996

[30] Foreign Application Priority Data

Apr. 14, 1995 [IT] Italy ................................ MI95A0782
Dec. 11, 1995 [IT] Italy ................................ MI95A2588

[51] Int. Cl.⁶ ...................................................... C21C 5/32
[52] U.S. Cl. ............................................................. 266/225
[58] Field of Search .................................... 266/225, 265

[56] References Cited

U.S. PATENT DOCUMENTS 4,986,847 1/1991 Knapp et al. ........................... 266/225
5,308,043 5/1994 Floyd et al. ............................ 266/225
5,377,960 1/1995 Leczo et al. ........................... 266/225

FOREIGN PATENT DOCUMENTS 2644558 9/1990 France .
0049185 9/1965 Luxembourg .
1072121 6/1967 United Kingdom .

*Primary Examiner*—Scott Kastler
*Attorney, Agent, or Firm*—Guido Modiano; Albert Josif

[57] ABSTRACT

A lance for blowing fluid-state substances inside furnaces, particularly for steel production. The lance comprises an elongated body inside which at least two ducts are provided which lead outside the body proximate to one of its longitudinal ends. These ducts can be connected to means for feeding fluid-state substances to be blown inside the furnace, and a chamber for the circulation of a coolant is formed inside the body of the lance at least proximate to its end to be inserted in the furnace.

9 Claims, 4 Drawing Sheets

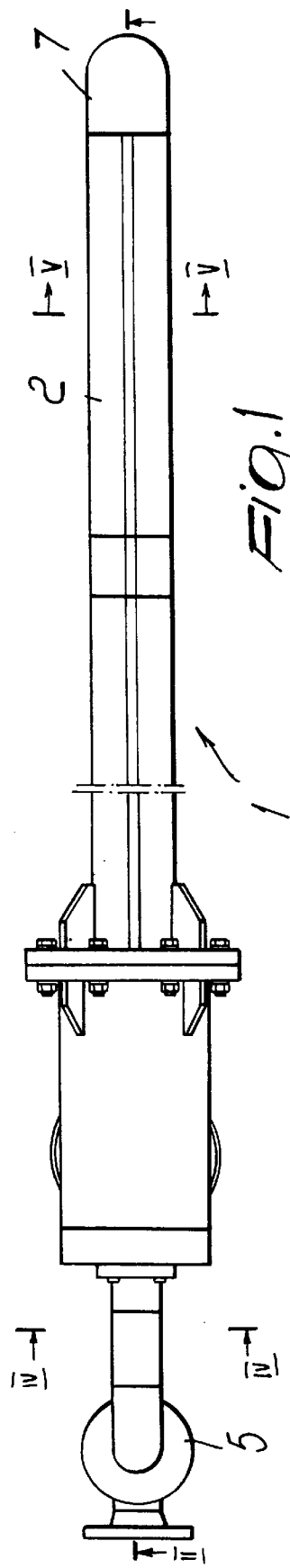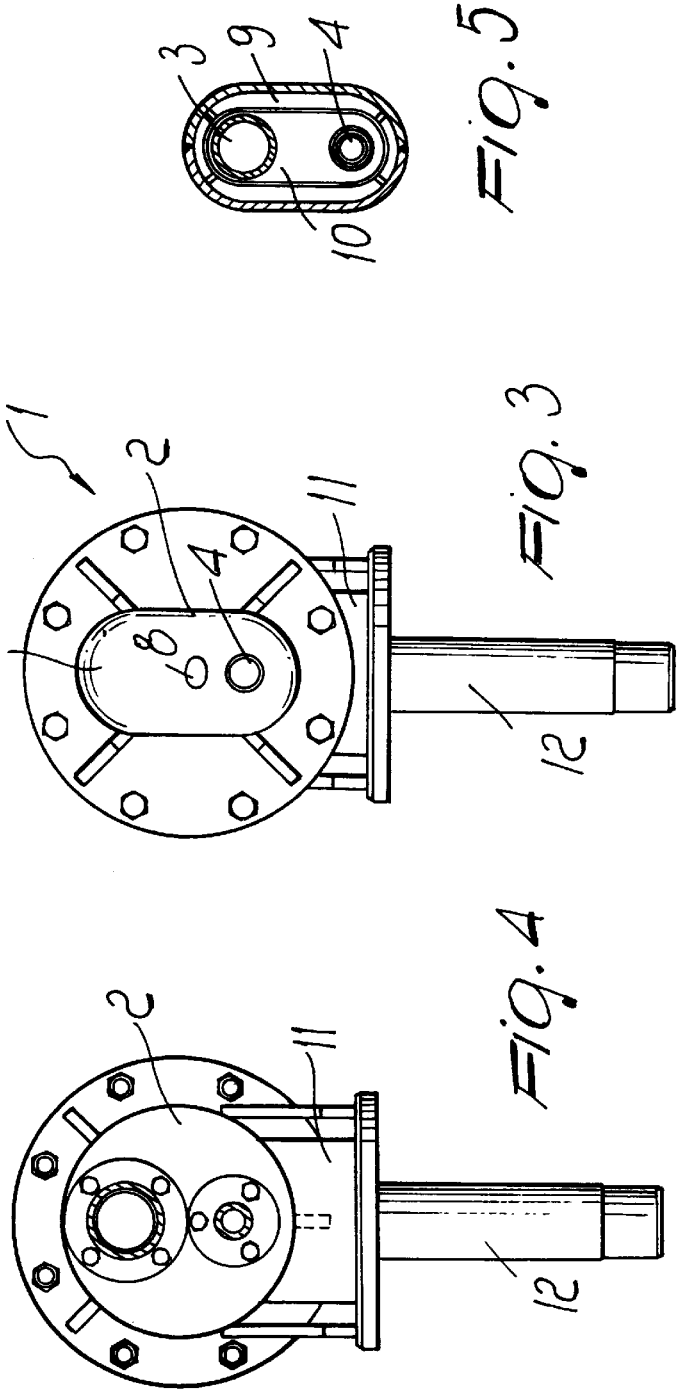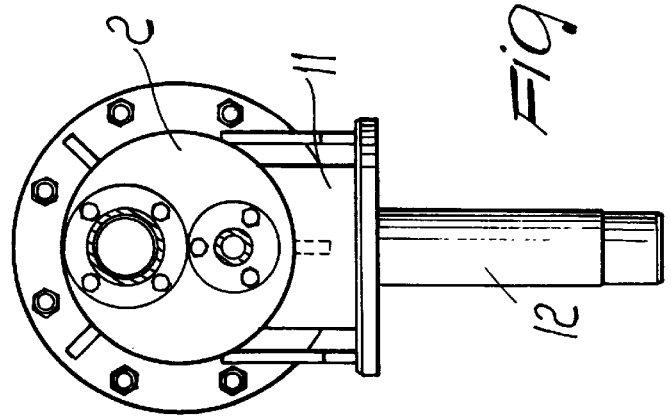

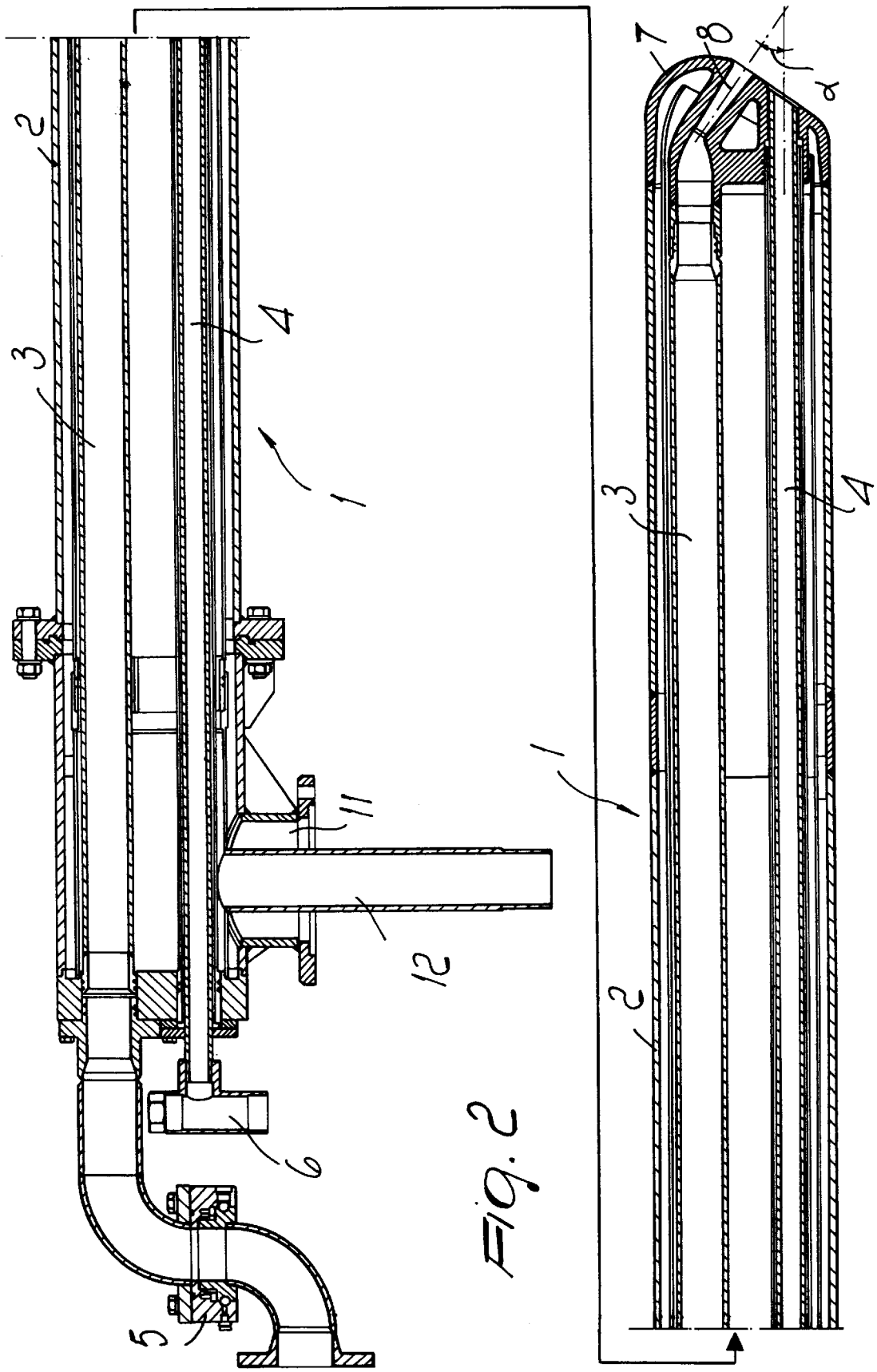

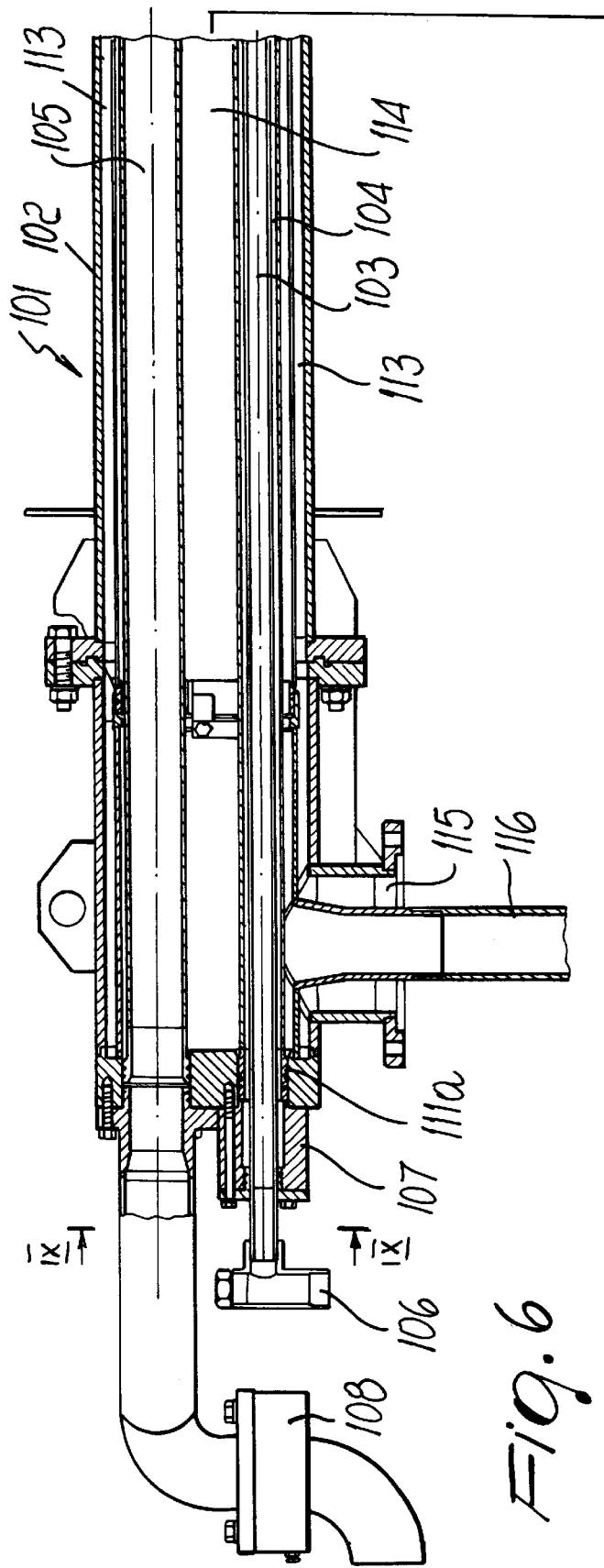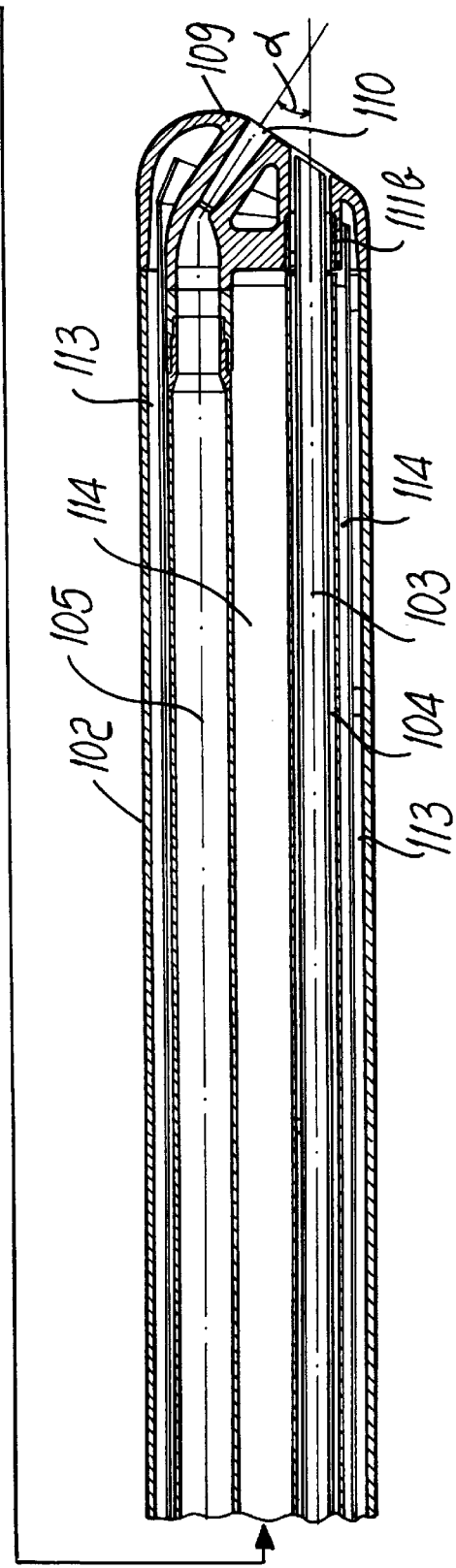
Fig. 6

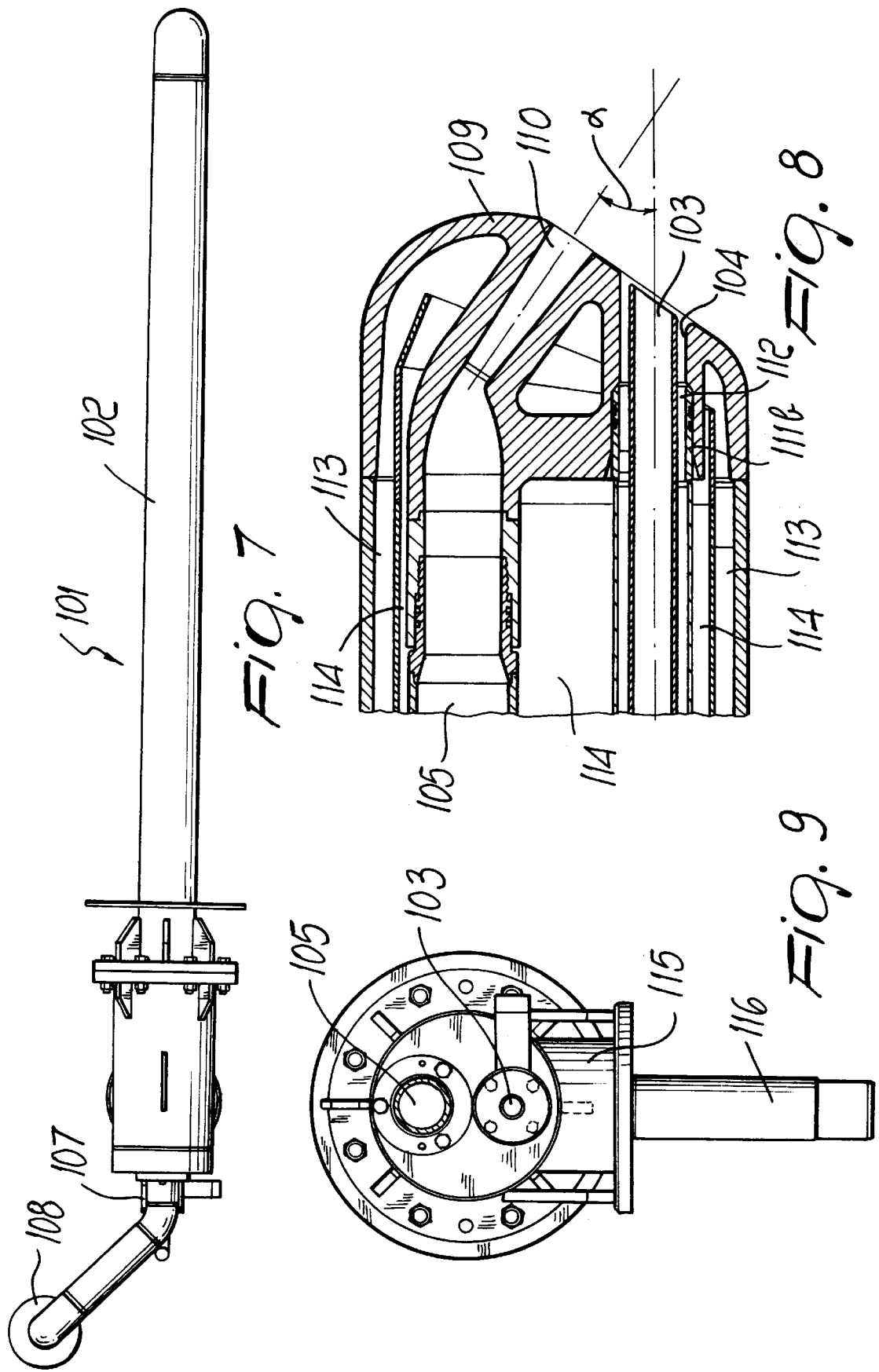

a
LANCE FOR BLOWING FLUID-STATE SUBSTANCES INSIDE FURNACES, PARTICULARLY FOR STEEL PRODUCTION

BACKGROUND OF THE INVENTION

The present invention relates to a lance for blowing fluid-state substances inside furnaces, particularly for steel production.

It is known that processes for producing steel with electric furnaces require the blowing of fluid-state substances inside the furnace.

These substances are blown by means of lances which are inserted in the furnace through appropriate doors formed in the side walls of the furnace, above the level of the liquid metal.

Thus, for example, during the loading of the furnace with the scrap or ferrous material that constitutes the raw material for steel production, the loaded material is striked with a jet of oxygen, delivered by an appropriate lance, which has the purpose of cutting the loaded material, facilitating its descent into the furnace, and to provide heat energy to assist in the melting of the material that has been introduced.

During the subsequent refining step, oxygen and coal fines are blown into the slag that covers the liquid metal. The blowing of oxygen and coal during this step has a chemical effect on the metal, since the blown substances react together and with the liquid metal, facilitating the foaming of the slag, and a physical effect, since the delivered jet keeps the liquid metal in constant motion, facilitating chemical reactions and producing uniform characteristics of the metal throughout its mass.

It should be noted that during the refining step the stream of oxygen must combine with the stream of coal so as to achieve a chemical reaction between the oxygen and the coal with the formation of CO, which is indispensable for slagging.

Therefore, the lance through which oxygen is blown is first connected to one or more lances through which the coal fines are blown so that the streams exiting from the various lances must meet at a preset angle.

Due to the high temperature inside the furnace, the lances, which are usually mainly made of carbon steel, can undergo unwanted deformations that alter, in the course of time, the angle at which the streams of the blown substances meet, leading to results that are significantly poorer than theoretical ones.

Furthermore, during the testing of new steel production processes, the need has been felt to blow, with particular methods, a plurality of substances inside the furnace. Known lances, due to the difficulty in ensuring correct orientation of the streams of the delivered fluids, do not allow to achieve optimum results in this operating practice.

SUMMARY OF THE INVENTION

A principal aim of the present invention is to provide a lance that allows, when required, to simultaneously blow a plurality of substances inside the furnace, maintaining a correct relative orientation of the various streams of the blown substances to achieve optimum efficiency in modern steel production processes.

Within the scope of this aim, an object of the invention is to provide a lance that is very simple and easy to use.

Another object of the invention is to provide a lance that can be manufactured with competitive costs with respect to those of conventional lances.

Another object of the invention is to provide a lance that in any case allows to blow even just one substance inside the furnace, so as to fully meet the operating requirements during the various steps for producing steel with electric furnaces.

Another object of the invention is to provide a lance that allows to achieve fully satisfactory results as regards the mixing of the substances during blowing.

This aim, these objects, and others which will become apparent hereinafter are achieved by a lance for blowing fluid-state substances inside furnaces, particularly for steel production, characterized in that it comprises an elongated body in which at least two ducts are formed which lead outside said body proximate to one of its longitudinal ends, said at least two ducts being connectable to means for feeding fluid-state substances to be blown inside the furnace, a chamber for the circulation of a coolant being formed inside said body at least proximate to said end.

BRIEF DESCRIPTION OF THE DRAWINGS

Further characteristics and advantages of the invention will become apparent from the description of two preferred but not exclusive embodiments of the lance according to the invention, illustrated only by way of non-limitative example in the accompanying drawings, wherein:

FIGS. 1, 2, 3, 4 and 5 are views of the lance according to the invention in a first embodiment, and more particularly:

FIG. 1 is a top plan view of the lance according to the invention;

FIG. 2 is an axial sectional view of the lance according to the invention, taken along the plane II—II of FIG. 1;

FIG. 3 is a front elevation view of the lance according to the invention;

FIG. 4 is a sectional view of FIG. 1, taken along the plane IV—IV;

FIG. 5 is a sectional view of FIG. 1, taken along the plane V—V;

FIGS. 6, 7, 8 and 9 are views of the lance according to the invention in a second embodiment, and more particularly;

FIG. 6 is an axial sectional view of the lance according to the invention;

FIG. 7 is a top plan view of the lance according to the invention;

FIG. 8 is an enlarged-scale view of a detail of FIG. 6;

FIG. 9 is a sectional view of FIG. 6, taken along the plane IX—IX.

DESCRIPTION OF THE PREFERRED EMBODIMENTS

With reference to the above figures, the lance according to the invention, generally designated by the reference numerals 1 and 101 in its two embodiments, comprises an elongated body 2, 102 inside which at least two ducts are provided, respectively two ducts 3 and 4 in the first embodiment and three ducts 103, 104, and 105 in the second embodiment, which can be connected, proximate to the rear end of the lance, for example by virtue of conventional couplings 5, 6, 106, 107, and 108, to feeding means, also of a known type and not shown for the sake of simplicity, for feeding fluid-state substances to be blown inside the furnace.

More particularly, the body 2, 102 is substantially constituted by a substantially cylindrical body that is internally hollow, and the ducts 3, 4, 103, 104, and 105 are formed by tubular bodies inserted inside the body 2, 102.

More particularly, in the first embodiment shown in FIGS. 1 to 5 the duct 4 runs substantially parallel to the longitudinal axis of the body 2 and leads out of the body 2 at its front end or tip 7, whereas the duct 3 also runs parallel to the longitudinal axis of the body 2 and ends with a delivery nozzle 8 the direction whereof is inclined with respect to said axis so as to intersect the delivery direction of the duct 4 outside the body 2.

Preferably, the outlets of the ducts 3 and 4 are orientated so that the two delivery directions mutually intersect at an angle α that is substantially between 30° and 40°, preferably 35°.

In the second embodiment, shown in FIGS. 6 to 9, the third duct 103, at least proximate to its end leading outside the body 102, runs inside the second duct 104.

Preferably, the third duct 103 runs internally and coaxially inside the second duct 104, substantially along its entire longitudinal extension inside the body 102.

The first duct 103 and the second duct 104 run substantially parallel to the longitudinal axis of the body 102 and lead outside the body 102 at its front end or tip 109, whereas the first duct 105 also runs parallel to the longitudinal axis of the body 102 and ends with a delivery nozzle 110 the direction whereof is inclined with respect to said axis to as to intersect, outside the body 102, the delivery direction of the third duct 103 and of the second duct 104.

Preferably, the outlet of the first duct 105 and the outlet of the third duct 103 and of the second duct 104 are orientated so that the two delivery directions mutually intersect at an angle a that is substantially between 30° and 40°, preferably 35°.

Advantageously, the third duct 103 is supported inside the second duct 104 by means of bushes 111a and 111b, wherein axial ducts 112 for the passage of the fluid-state substances blown in the second duct 104 are provided.

Both in the first and in the second embodiments, inside the body 2, 102, at least proximate to its end or tip 7, 109 to be inserted in the furnace, there is provided a chamber for the circulation of a coolant, constituted for example by water.

More particularly, the entire cavity inside the body 2, 102 that is not occupied by the ducts 3, 4, 103, 104, 105 is substantially divided into two portions: one portion, designated by the reference numerals 9, 113, is located directly adjacent to the internal surface of the skin of the body 2, 102, and the other portion, designated by the reference numerals 10, 114, is more internal. These portions respectively constitute a delivery portion and a return portion for the coolant pumped inside the body 2, 102. The portion 9, 113 and the portion 10, 114 are interconnected proximate to the tip of the lance.

The delivery portion 9, 113 is connected to an inlet 11, 115, whereas the return portion 10, 114, is connected to an outlet 12, 116; said inlet and said outlet are connected to known pumping means for pumping the coolant, not shown for the sake of simplicity and constituted for example by a pump that is served by an appropriate cooling circuit.

The portion of the body 2, 102 that is located proximate to the tip 7, 109, or its portion which during refining is meant to be immersed in the slag above the level of the liquid metal, is preferably made of a material with high thermal conductivity, such as for example copper, so as to ensure, at the region of the lance that is subjected to the most intense thermal stresses, an effective removal of heat to avoid as much as possible deformations or damage of the body of the lance during use.

Use of the lance according to the invention is evident from what has been described and illustrated. In particular, it is evident that the lance according to the invention can be used in the various steps of steel production to blow oxygen and/or other substances inside the furnace.

In particular, the lance according to the invention, in the first embodiment, during furnace loading, with the duct 3 connected to oxygen pumping means, is inserted in the furnace and used substantially as a conventional lance to cut the scrap or ferrous material inserted in the furnace and to assist melting.

During this step, since the blowing of coal fines is not required, the duct 4 is not used.

During refining, the duct 3 is connected to oxygen supply means, whereas the duct 4 is connected to coal fines supply means and the lance is inserted in the furnace and placed so that its tip 7 is in the layer of slag that covers the liquid metal.

In the lance shown in FIGS. 6 to 9, the first duct 103 is preferably meant to be used to blow hydrocarbons, preferably methane, or coal fines, but also other appropriately fluidified substances according to the requirements.

The second duct 104 is preferably used to inject hydrocarbons the jet whereof, as it leaves the lance, includes the substances blown through the first duct 103.

The third duct 105 is preferably used to blow oxygen.

Depending on the various steps for steel production, the various ducts 103, 104, 105 can be used to blow a single substance or a plurality of substances simultaneously inside the furnace, according to the requirements.

It should be noted that since the lance according to the invention is practically monolithic, the directions of the streams of the blown substances remain practically unchanged during blowing, allowing to achieve high efficiency of the lance during its use, achieving better qualitative performance and better utilization of the blown substances.

In practice it has been observed that the lance according to the invention fully achieves the intended aim, since by having a practically monolithic body inside which a plurality of ducts are provided for the simultaneous blowing of a plurality of fluid-state substances inside a furnace for steel production, it keeps the various streams orientated correctly in the course of time, achieving the maximum possible level in terms of efficiency.

Of course, two or three ducts, as described, or a plurality of ducts according to the operating requirements, can be formed inside the body of the lance.

The lance thus conceived is susceptible of numerous modifications and variations, all of which are within the scope of the inventive concept; all the details may furthermore be replaced with other technically equivalent elements.

In practice, the materials employed, so long as they are compatible with the specific use, as well as the dimensions, may be any according to the requirements and the state of the art.

What is claimed is:

1. A lance for blowing fluid-state substances inside furnaces, for steel production, comprising an elongated body in which at least two ducts are formed which lead outside said body in the proximity of one of its longitudinal ends, said at least two ducts being connectable to means for feeding fluid-state substances to be blown inside the furnace, a chamber for the circulation of a coolant being formed inside said body at least in correspondence of said end, wherein the outlets of said at least two ducts are orientated in two delivery directions converging outside the lance.

2. A lance according to claim 1, wherein at least said longitudinal end of said body is made of a metallic material having high thermal conductivity.

3. A lance according to claim 1, wherein said elongated body accommodates at least three ducts: a first duct, a second duct, and a third duct, said third duct running, at least in the proximity of its ends that lead outside said body, inside said second duct.

4. A lance according to claim 3, wherein said third duct, at least in the proximity of its end that leads outside said body, runs coaxially inside said second duct.

5. A lance according to claim 4, wherein an outlet of the first duct and the outlet of said second and third ducts are orientated along two delivery directions converging outside said body.

6. A lance according to claim 1, wherein said two delivery directions intersect at an angle substantially between 30° and 40°.

7. A lance according to claim 1, wherein said two delivery directions mutually intersect at an angle of substantially 35°.

8. A lance according to claim 1, wherein said chamber for circulating a coolant comprises a delivery portion that is adjacent to the internal skin of said body and a return portion that lies inside said delivery portion.

9. A lance according to claim 1, wherein said ducts are formed by tubular bodies inserted in said body.

* * * * *